(12) United States Patent
Hu et al.

(10) Patent No.: US 12,237,999 B1
(45) Date of Patent: Feb. 25, 2025

(54) LOGICAL PORT ADMINISTRATIVE STATES

(71) Applicant: Juniper Networks, Inc., Sunnyvale, CA (US)

(72) Inventors: Hanzhong Hu, Chelmsford, MA (US); Cristina Radulescu-Banu, Lexington, MA (US); John E. Ziegler, Westborough, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/473,682

(22) Filed: Sep. 25, 2023

(51) Int. Cl.
G06F 15/173 (2006.01)
H04L 45/02 (2022.01)
H04L 45/302 (2022.01)
H04L 45/42 (2022.01)

(52) U.S. Cl.
CPC .............. *H04L 45/42* (2013.01); *H04L 45/02* (2013.01); *H04L 45/308* (2013.01)

(58) Field of Classification Search
CPC ........ H04L 45/42; H04L 45/02; H04L 45/308
USPC ........................................................ 709/238
See application file for complete search history.

(56) References Cited

U.S. PATENT DOCUMENTS

| | | | | |
|---|---|---|---|---|
| 5,636,214 A * | 6/1997 | Kranzler | ............... | H04L 12/413 370/445 |
| 7,039,827 B2 * | 5/2006 | Meyer | ................ | G06F 11/0766 714/4.11 |
| 7,715,391 B1 * | 5/2010 | Wadhwa | ............... | H04L 12/185 370/390 |
| 8,203,943 B2 * | 6/2012 | Dec | ..................... | H04L 12/2856 370/230 |
| 8,755,685 B2 * | 6/2014 | Zheng | .................... | H04L 45/22 398/58 |
| 9,077,661 B2 * | 7/2015 | Andreasen | .......... | H04L 41/5051 |
| 9,113,405 B2 * | 8/2015 | Garcia | ............... | H04L 12/5692 |
| 9,660,934 B2 * | 5/2017 | Bifulco | ............... | H04L 12/4633 |
| 10,033,589 B1 * | 7/2018 | Batta | ................... | H04L 41/0893 |
| 10,735,995 B1 * | 8/2020 | Pocha | ............... | H04W 28/0263 |
| 11,172,031 B2 * | 11/2021 | Yu | ......................... | H04W 76/11 |
| 11,206,715 B2 * | 12/2021 | Pocha | ................... | H04W 28/24 |
| 11,252,606 B2 * | 2/2022 | Pocha | ................... | H04W 12/06 |
| 11,412,436 B2 * | 8/2022 | Kakinada | .............. | H04W 40/34 |
| 11,582,113 B2 * | 2/2023 | Hua | ...................... | H04L 12/2859 |
| 11,765,790 B2 * | 9/2023 | Pocha | ................... | H04W 28/24 370/401 |
| 11,902,381 B2 * | 2/2024 | Yu | ....................... | H04L 12/4633 |
| 11,910,293 B2 * | 2/2024 | Kakinada | .............. | H04W 72/21 |
| 12,021,824 B2 * | 6/2024 | Zhang | ................. | H04L 61/2514 |
| 2003/0206548 A1 * | 11/2003 | Bannai | ................... | H04L 45/308 370/389 |
| 2008/0285437 A1 * | 11/2008 | Polland | ................... | H04L 49/50 370/219 |
| 2021/0266234 A1 * | 8/2021 | Barnett, Jr. | .......... | H04L 47/765 |
| 2021/0409335 A1 * | 12/2021 | Zhu | ......................... | H04L 47/24 |
| 2022/0005077 A1 * | 1/2022 | Krishnamurthy | ..... | H04W 16/24 |
| 2022/0109642 A1 * | 4/2022 | Baizhiyenov | .......... | H04L 49/45 |

(Continued)

*Primary Examiner* — Alicia Baturay
(74) *Attorney, Agent, or Firm* — Harrity & Harrity, LLP

(57) ABSTRACT

In some implementations, a network device may identify a triggering event associated with a logical port. The logical port may be associated with a subscriber group that is associated with a user plane subscriber access device. The network device may assign, based at least in part on the triggering event, a logical port administrative state to the logical port.

20 Claims, 10 Drawing Sheets

(56) References Cited

U.S. PATENT DOCUMENTS

| | | | |
|---|---|---|---|
| 2022/0116334 A1* | 4/2022 | Zhu | H04W 76/15 |
| 2022/0124043 A1* | 4/2022 | Zhu | H04L 47/2475 |
| 2022/0124588 A1* | 4/2022 | Zhu | H04W 28/0236 |
| 2023/0239359 A1* | 7/2023 | Padebettu | H04L 67/141 |
| | | | 370/236 |
| 2023/0353455 A1* | 11/2023 | Zhu | H04L 67/12 |
| 2023/0370927 A1* | 11/2023 | Yu | H04W 36/08 |
| 2023/0370938 A1* | 11/2023 | Hua | H04W 40/02 |
| 2024/0056391 A1* | 2/2024 | Peng | H04M 15/8033 |
| 2024/0106727 A1* | 3/2024 | Peng | H04L 41/12 |
| 2024/0171652 A1* | 5/2024 | Li | H04L 41/0654 |

\* cited by examiner

LOGICAL PORT ADMINISTRATIVE STATES

BACKGROUND

A broadband network gateway (BNG) routes traffic to and from broadband remote access devices, such as digital subscriber line access multiplexers (DSLAMs), on an Internet service provider (ISP) network. The BNG enables subscribers to connect to the broadband network, and performs authentication, authorization, and accounting; assigns Internet protocol (IP) addresses; and enforces quality of service (QOS) policies, among other examples.

SUMMARY

Some aspects described herein relate to a method. The method may include identifying, by a network device, a triggering event associated with a logical port, wherein the logical port is associated with a subscriber group (SGRP) that is associated with a user plane subscriber access device. The method may include assigning, by the network device, based at least in part on the triggering event, a logical port administrative state to the logical port.

Some aspects described herein relate to a network device. The network device may include one or more memories and one or more processors coupled to the one or more memories. The one or more processors may identify a triggering event associated with a logical port, wherein the logical port is associated with an SGRP that is associated with a user plane subscriber access device. The one or more processors may assign, based at least in part on the triggering event, a logical port administrative state to the logical port.

Some aspects described herein relate to a non-transitory computer-readable medium that stores a set of instructions. The set of instructions, when executed by one or more processors of a network device, may cause the network device to identify a triggering event associated with a logical port, wherein the logical port is associated with an SGRP that is associated with a user plane subscriber access device. The set of instructions, when executed by one or more processors of the network device, may cause the network device to assign, based at least in part on the triggering event, a logical port administrative state to the logical port.

DETAILED DESCRIPTION

Figure 1:
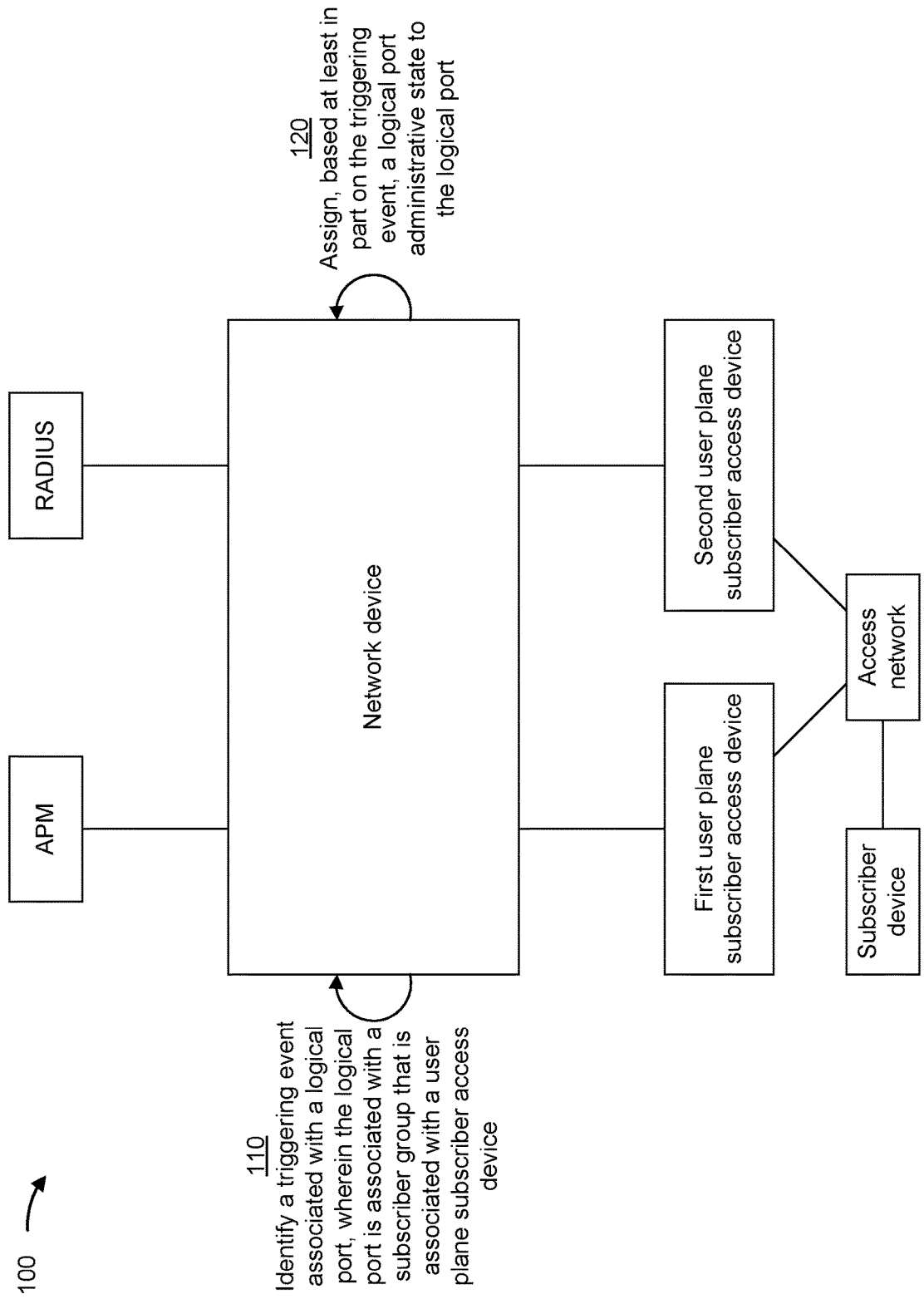
FIG. 1 is a diagram of an example implementation associated with logical port administrative states.

The following detailed description of example implementations refers to the accompanying drawings. The same reference numbers in different drawings may identify the same or similar elements.

An SGRP may include a subscriber and/or one or more other subscribers that share, with the subscriber, similar or the same network traffic characteristics, service level agreements, or the like. An SGRP can be associated with a logical port of a user plane subscriber access device. For example, packets can be transmitted to or from subscribers of the SGRP via the logical port.

Various events can occur with respect to the user plane subscriber access device that can impact the logical ports (e.g., switchover to another user plane subscriber access device, the user plane subscriber access device going down, a line card of the user plane subscriber access device going down, or the like). However, there are no well-defined states for the logical port that are associated with the events. For example, state transitions and events for the logical port have not been defined at a control plane subscriber access device associated with the user plane subscriber access device. Without defined states (and/or state transitions, events, or the like) for logical ports, the control plane subscriber access device is unable to carry out events (e.g., initiating SGRP switchovers, handling a user plane subscriber access device going down, handing user plane subscriber access device notifications of port reports (e.g., packet forwarding control protocol (PFCP) port reports) during a line card restart, or the like).

Some implementations described herein define logical port administrative states and enable a control plane subscriber access device to use one or more of the logical port administrative states in response to various triggers (e.g., in response to system events), such as switchover requirements, line card restarts, state changes or reconfigurations associated with a user plane subscriber access device, or the like. In some examples, the control plane subscriber access device may identify a triggering event associated with a logical port associated with an SGRP. The control plane subscriber access device may assign, based at least in part on the triggering event, a logical port administrative state to the logical port.

As a result, assigning the logical port administrative state to the logical port may enable the control plane subscriber access device to define a set of SGRP port states and events. Based on the states and events, the control plane subscriber access device may carry out events that impact the logical ports. For example, the control plane subscriber access device may react (or not react) to subscriber logins, initiate (e.g., trigger) SGRP switchovers, handle the user plane subscriber access device going down and/or rebooting or line card restarts (e.g., reboots) while also handing user plane subscriber access device notifications of port reports in case of resilient or non-resilient SGRPs, port deletes, port adds, or the like.

FIG. 1 is a diagram of an example implementation 100 associated with logical port administrative states. As shown in FIG. 1, example implementation 100 includes a subscriber device (e.g., a residential gateway (RG), customer premises equipment (CPE), a user equipment (UE), and/or the like), an access network (e.g., a layer 2 (L2) access network or the like), a first user plane subscriber access device (e.g., a first BNG user plane (BNG-UP) device), a second user plane subscriber access device (e.g., a second BNG-UP device), a network device (e.g., a control plane subscriber access device, such as a BNG control plane (BNG-CP) device), an access policy manager (APM), and a remote authentication dial-in user service (RADIUS) server. These devices are described in more detail below in connection with FIGS. 7-9.

A subscriber associated with the subscriber device may belong to an SGRP that includes the subscriber and one or more other subscribers. Grouping subscribers into SGRPs may improve core routing efficiency. SGRPs may be defined based on user plane interfaces. For example, SGRPs may span the first user plane subscriber access device and the second user plane subscriber access device. The SGRP may contain one or more redundancy interfaces. For example, the SGRP may contain one redundancy interface on each user plane subscriber access device.

The SGRP may be active on only one user plane subscriber access device at a time. For example, one of the first and second user plane subscriber access devices may be active for the SGRP, and the other of the first and second user plane subscriber access devices may serve as a backup (e.g., in the event of a failure associated with the active user plane subscriber access devices). Subscribers associated with the SGRP may be serviced by only the active user plane subscriber access device.

All interfaces in the SGRP may move at the same time (e.g., in the event of a switchover from the active user plane subscriber access device to the backup user plane subscriber access device). Switchovers may be controlled by either the network device (e.g., the control plane subscriber access device) or the user plane subscriber access device. In some examples, a user plane subscriber access device may be associated with multiple SGRPs. All subscribers on a user plane subscriber access device may belong to an SGRP.

As shown by reference number 110, the network device may identify a triggering event associated with a logical port. The logical port may be associated with an SGRP that is associated with a user plane subscriber access device. For example, traffic associated with the SGRP (e.g., traffic transmitted to or from the subscriber device) may be transmitted via the logical port. For example, the logical port may be associated with the first (e.g., active) user plane subscriber access device. For example, traffic may be transmitted to or from the first user plane subscriber access device via the logical port. Specific examples of triggering events are discussed in greater detail below in connection with FIGS. 2-6.

As shown by reference number 120, the network device may assign, based at least in part on the triggering event, a logical port administrative state (e.g., an SGRP resiliency port administrative state) to the logical port. The logical port administrative state may include a "Port-Not-Present" (or "Not-Present") state, a "No-SGRP-On-UP" state, an "Enabled" state, a "Quiesce-in-Progress" state, a "Delete-in-Progress-Move" state, a "Delete-Done" state, a "Delete-in-Progress-UP-Cold-Boot" state, a "Delete-in-Progress-UP-Port-Delete" state, or the like.

The "Port-Not-Present" state may be associated with the logical port not being present on the user plane subscriber access device. For example, while in the "Port-Not-Present" state, the logical port may not be confirmed to be present on the user plane subscriber access device. In some examples, the logical port may be in an SGRP configuration but the network device has not received a port report from the user plane subscriber access device. In some examples, the network device may have received an indication that the logical port was deleted via a port report from the user plane subscriber access device.

The "No-SGRP-On-UP" state may be associated with the user plane subscriber access device not having acknowledged an indication that the logical port is associated with the SGRP. For example, the network device may not have received an acknowledgement, from the user plane subscriber access device, of SGRP node information for the logical port.

The "Enabled" state may be associated with the logical port being enabled. For example, the "Enabled" state may be set for the logical port when an interface for the port is ready to send and/or receive network traffic.

The "Quiesce-in-Progress" state may be associated with the user plane subscriber access device entering a quiescent state. For example, the "Quiesce-in-Progress" state may stop all log-ins for subscribers in the SGRP. When a logical port is in the "Quiesce-in-Progress" state, packets associated with the logical port may be selectively dropped based at least in part on a priority of the packets. For example, the user plane subscriber access device may drop (e.g., discard), or not drop, a packet sent or received via the logical port based on the priority of the packet. For example, packets having a priority that does not satisfy a priority threshold (e.g., packets having a priority equal to or below a priority threshold) may be dropped, and packets having a priority that satisfy the priority threshold (e.g., packets having a priority equal to or above a priority threshold) may be allowed (e.g., not dropped). For example, session initiation packets may be low-priority packets that are discarded, and session termination packets may be high-priority packets that are allowed.

The "Quiesce-in-Progress" state may be set upon a "quiesce-start" triggering event, such as a control-plane-initiated (e.g., network-device-initiated) switchover beginning. The "Quiesce-in-Progress" state may be reset when new active-backup states are achieved from the switchover. For example, if the first user plane subscriber access device is initially the active user plane subscriber access device and the second user plane subscriber access device is initially the backup user plane subscriber access device, then the "Quiesce-in-Progress" state may be reset (e.g., the "Quiesce-in-Progress" state may end) after the switchover is complete such that the first user plane subscriber access device is the backup user plane subscriber access device and the second user plane subscriber access device is the active user plane subscriber access device.

The "Delete-in-Progress-Move" state may be associated with the logical port being moved from the SGRP to another SGRP. For example, the "Delete-in-Progress-Move" state may be set when the logical port is moved from one SGRP to another SGRP (e.g., when a logical port from a default SGRP is added to a configured SGRP). A logical port in the "Delete-in-Progress-Move" state may be unhealthy.

The "Delete-Done" state may be associated with the logical port being unhealthy. For example, a logical port that is not healthy may be assigned the "Delete-Done" state.

The "Delete-in-Progress-UP-Cold-Boot" state may be associated with a deletion of the logical port due to a cold boot associated with the user plane subscriber access device being in progress. For example, a logical port that is being cleaned up due to a cold boot of the user plane subscriber access device may be in the "Delete-in-Progress-UP-Cold-Boot" state.

The "Delete-in-Progress-UP-Port-Delete" state may be associated with a deletion of the logical port due to a report associated with the deletion of the logical port being in progress. For example, a logical port that is being cleaned up due to a delete port report received from the user plane subscriber access device may be in the "Delete-in-Progress-UP-Cold-Boot" state.

In some examples, the logical port administrative state of a logical port and/or the health of the SGRP associated with the logical port may impact the operational state associated with the logical port. The operational state of the logical port may control packet input/output processing of the logical port. The operational state may be a down state, an up state, or a quiescent state. In the down state, the logical port may drop all packets. In the up state, the logical port may allow all packets. In the quiescent state, the logical port may allow only high-priority packets. For example, during the quiescent state, a packet associated with the logical port may be selectively dropped based at least in part on a priority of the packet. For example, the user plane subscriber access device may drop, or not drop, a packet sent or received via the logical port based on the priority of the packet. For example, packets having a priority that does not satisfy a priority threshold (e.g., packets having a priority equal to or below a priority threshold) may be dropped, and packets having a priority that satisfy the priority threshold (e.g., packets having a priority equal to or above a priority threshold) may be allowed (e.g., not dropped).

In some examples, a device manager may evaluate the operational state based on a state (e.g., a health state) of the SGRP associated with the logical port and the logical port administrative state. For example, the device manager may evaluate the operational state of a logical port according to the following pseudocode:

Instruction 1. If SGRP state unhealthy→operational state is down
Instruction 2. Else if logical port administrative state is "Quiesce-in-Progress"→operational state is quiescent
Instruction 3. Else if logical port administrative state is not "Enabled"→operational state is down
Instruction 4. Else if logical port administrative state is "Enabled" and SGRP state is active→operational state is up
Instruction 5. Else if logical port administrative state is Enabled and SGRP state is backup→operational state is down In some examples, the SGRP state may be unhealthy, and the operational state associated with the logical port may be down (e.g., instruction 1 of the pseudocode). In some examples, the logical port administrative state may be "Quiesce-in-Progress," and the operational state associated with the logical port may be a quiescent state (e.g., instruction 2 of the pseudocode). In some examples, the logical port administrative state may not be "Quiesce-in-Progress" or "Enabled," and the operational state associated with the logical port may be a down state (e.g., instruction 3 of the pseudocode). In some examples, the logical port administrative state may be "Enabled," a state associated with the SGRP may be an active state (e.g., the user plane subscriber access device is active), and the operational state associated with the logical port may be an up state (e.g., instruction 4 of the pseudocode). In some examples, the logical port administrative state may be "Enabled," a state associated with the SGRP is a backup state (e.g., the user plane subscriber access device is backup), and the operational state associated with the logical port is a down state.

The logical port administrative states may be visible to a network operator through a command line interface (CLI), telemetry, logging, or the like. An example CLI is provided as follows. In the example CLI, the logical port administrative state for both logical ports is "No-SGRP-On-UP," and as a result, the operational state for both logical ports are down states.

root@cp>show system subscriber-management subscriber-group group_B
Name: group_B
ID: 1
User-Plane: 1 (active)
User-Plane: 2 (backup)
Health status: healthy
Mode: User Plane
Virtual media access control (MAC): xx: xx: xx: xx: xx: xx
Logical port mapping:
Device Name Logical-port Sessions Logical-port Sessions
0.1 B1 up: 1 0 up: 2 0
root@cp>show system subscriber-management device interface 0.1 state
Port Admin-State Oper-State
up: 1 No SGRP on user plane down
up: 2 No SGRP on user plane down Assigning a logical port administrative state to a logical port may enable the network device to handle scenarios that impact the logical port. For example, the "Port-Not-Present" state may enable the network device to handle scenarios where the logical port is not present on the user plane subscriber access device. The "No-SGRP-On-UP" state may enable the network device to handle scenarios where the user plane subscriber access device has not acknowledged an indication that the logical port is associated with the SGRP. The "Enabled" state may enable the network device to handle scenarios where the logical port is enabled. The "Quiesce-in-Progress" state may enable the network device to handle scenarios where the user plane subscriber access device has entered a quiescent state. The "Delete-in-Progress-Move" state may enable the network device to handle scenarios where the logical port is moved from one SGRP to another SGRP. The "Delete-Done" state may enable the network device to handle scenarios where the logical port is unhealthy. The "Delete-in-Progress-UP-Cold-Boot" state may enable the network device to handle scenarios where the logical port is deleted due to a cold boot associated with the user plane subscriber access device. The "Delete-in-Progress-UP-Port-Delete" state may enable the network device to handle scenarios where the logical port is deleted due to a report associated with the deletion of the logical port.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
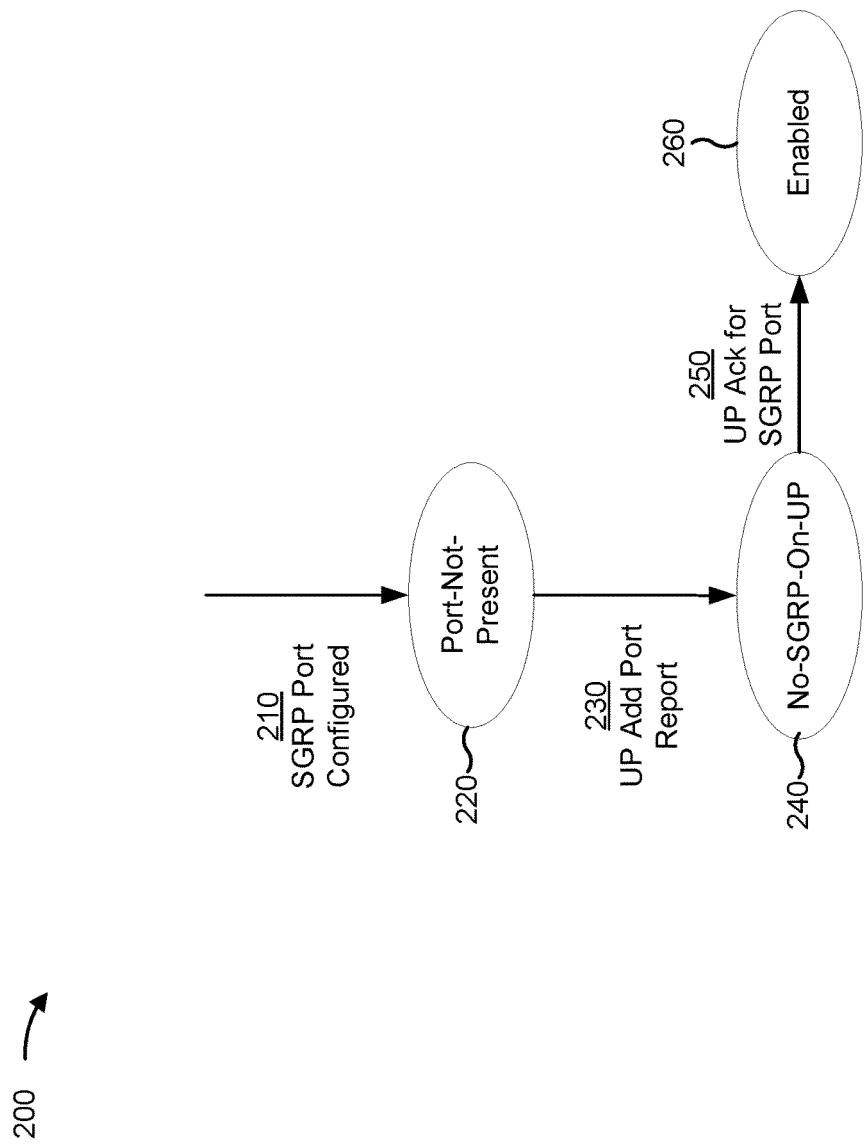
FIG. 2 is a diagram of an example implementation associated with configuring a logical port for an SGRP.

FIG. 2 is a diagram of an example implementation 200 associated with configuring a logical port for an SGRP. As shown by reference number 210, the network device identifies a first triggering event (e.g., a configuration of the logical port for an SGRP). As shown by reference number 220, the network device assigns, based at least in part on the first triggering event, a logical port administrative state of "Port-Not-Present" to the logical port. For example, the network device may set the logical port administrative state of the logical port to "Port-Not-Present" as an initial state in response to an SGRP port configured indication.

As shown by reference number 230, the network device identifies a second triggering event (e.g., a reception of a report associated with an addition of the logical port on the user plane subscriber access device). For example, the network device may receive, from the user plane subscriber access device, a port report announcing the existence and state of the logical port. For example, the network device may receive a user plane port add report that adds the logical port to a default SGRP. As shown by reference number 240, the network device assigns, based at least in part on the second triggering event, a logical port administrative state of "No-SGRP-On-UP" to the logical port.

As shown by reference number 250, the network device identifies a third triggering event (e.g., a reception of an acknowledgment of the indication that the logical port is associated with the SGRP). For example, the network device may receive an acknowledgement for the SGRP node. For example, the network device may receive confirmation that the logical port is configured on the user plane subscriber access device within a configured SGRP. For example, the network device may receive an indication that the logical port SGRP configuration is confirmed to be added on the user plane subscriber access device. As shown by reference number 260, the network device assigns, based at least in part on the third triggering event, a logical port administrative state of "Enabled" to the logical port.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
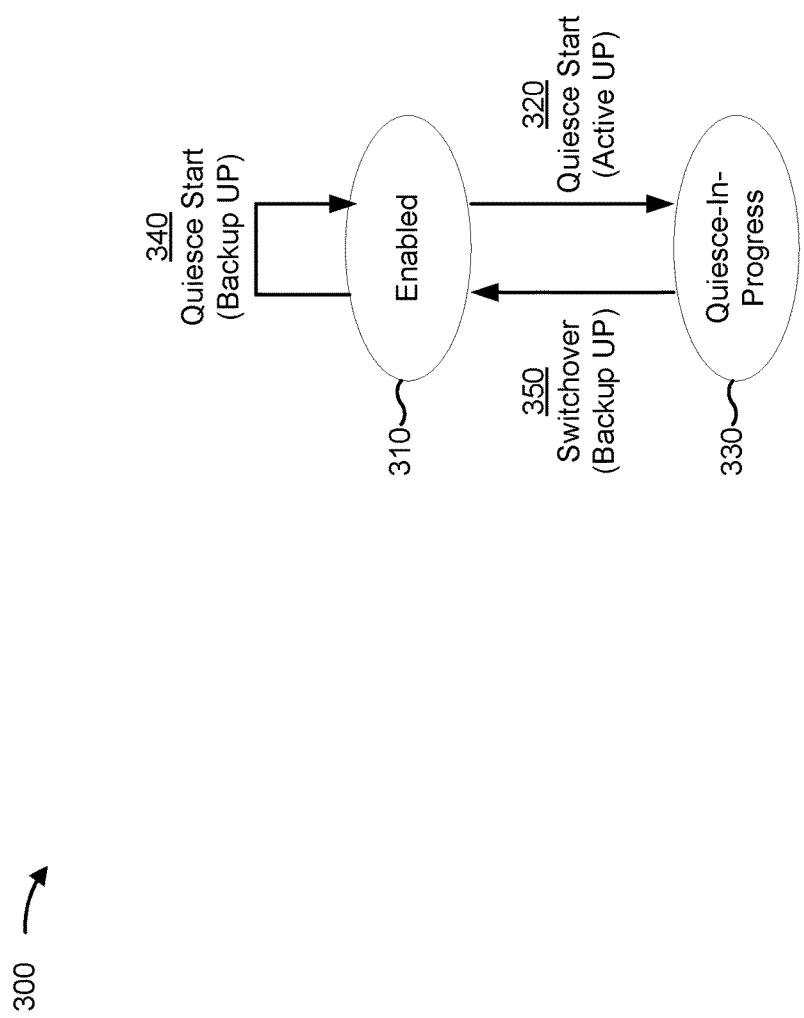
FIG. 3 is a diagram of an example implementation associated with control-plane-initiated switchover.

FIG. 3 is a diagram of an example implementation 300 associated with control-plane-initiated switchover. For example, the network device may initiate a switchover from the first user plane subscriber access device to the second user plane subscriber access device. Initially, the first user plane subscriber access device may be active and the second user plane subscriber access device may be backup.

As shown by reference number 310, the network device assigns, based at least in part on a first triggering event, a logical port administrative state of "Enabled" to a logical port associated with the first user plane subscriber access device and to a logical port associated with the second user plane subscriber access device. As shown by reference number 320, the network device identifies a second triggering event (e.g., a determination that a switchover from the first user plane subscriber access device to a second user plane subscriber access device is to occur). For example, the network device may indicate that the first user plane subscriber access device is to enter a quiescent state.

As shown by reference number 330, the network device may assign, based at least in part on the second triggering event, a logical port administrative state of "Quiesce-in-Progress" to the logical port associated with the first user plane subscriber access device. As shown by reference number 340, the logical port associated with the second user plane subscriber access device may remain in the "Enabled" state.

As shown by reference number 350, the network device identifies a third triggering event (e.g., the switchover). For example, the network device may determine that the switchover has occurred (e.g., the network device may determine that the first user plane subscriber access device is now the backup and the second user plane subscriber access device is now active). As shown by reference number 310, the network device may, based at least in part on the third triggering event, assign a logical port administrative state of "Enabled" to the logical port associated with the first user plane subscriber access device. Thus, the network device may handle unhealthy SGRP states due to transitions during switchover (e.g., "active-active," "backup-backup," or the like).

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
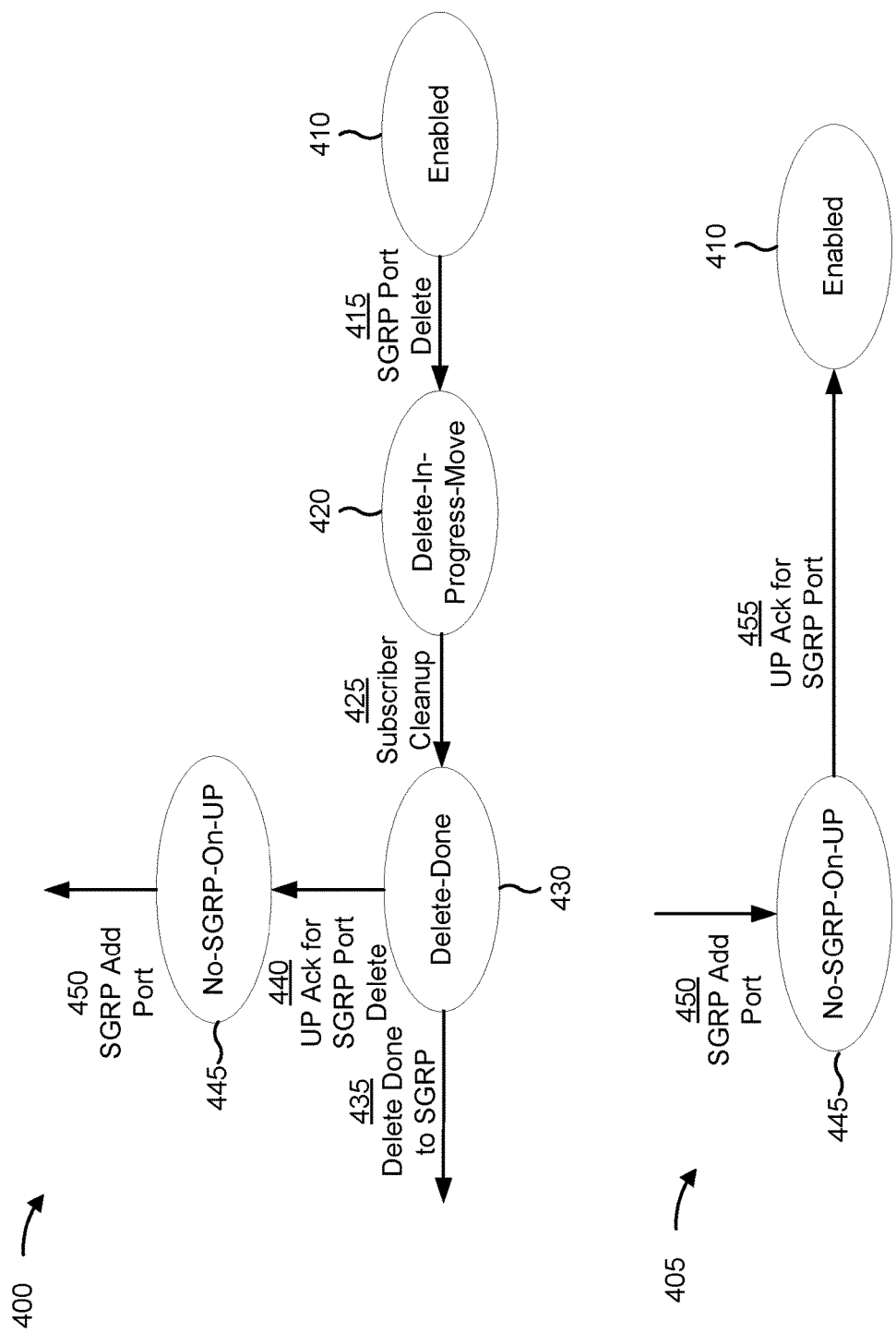
FIG. 4 is a diagram of example implementations associated with moving a logical port from a first SGRP to a second SGRP.

FIG. 4 is a diagram of example implementations 400 and 405 associated with moving a logical port from a first SGRP to a second SGRP. Implementation 400 is associated with unconfiguring (e.g., deleting) the logical port from the first SGRP, and implementation 405 is associated with reconfiguring (e.g., adding) the logical port for the second SGRP.

With reference to implementation 400, as shown by reference number 410, the network device assigns, based at least in part on a first triggering event, a logical port administrative state of "Enabled" to the logical port. As shown by reference number 415, the network device identifies a second triggering event (e.g., the logical port being deleted). As shown by reference number 420, the network device assigns, based at least in part on the second triggering event, a logical port administrative state of "Delete-in-Progress-Move" to the logical port.

As shown by reference number 425, the network device identifies a third triggering event (e.g., a cleanup operation associated with the first SGRP). As shown by reference number 430, the network device assigns, based at least in part on the third triggering event, a logical port administrative state of "Delete-Done" to the logical port. As shown by reference number 435, an indication of the "Delete-Done" state may be provided to the second SGRP.

As shown by reference number 440, the network device identifies a fourth triggering event (e.g., a reception of an acknowledgment that the logical port has been deleted). As shown by reference number 445, the network device assigns, based at least in part on the fourth triggering event, a logical port administrative state of "No-SGRP-On-UP" to the logical port. As shown by reference number 450, the network device transmits an indication to associate the logical port with the second SGRP.

With reference to implementation 405, as noted above and as shown by reference numbers 450 and 445, respectively, the network device transmits an indication to associate the logical port with the second SGRP, and the network device assigns a logical port administrative state of "No-SGRP-On-UP" to the logical port. As shown by reference number 455, the network device identifies a fifth triggering event (e.g., a reception of an acknowledgment of the indication that the logical port is associated with the second SGRP). As shown by reference number 410, the network device assigns, based at least in part on the fifth triggering event, the logical port administrative state of "Enabled" to the logical port.

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4.

Figure 5:
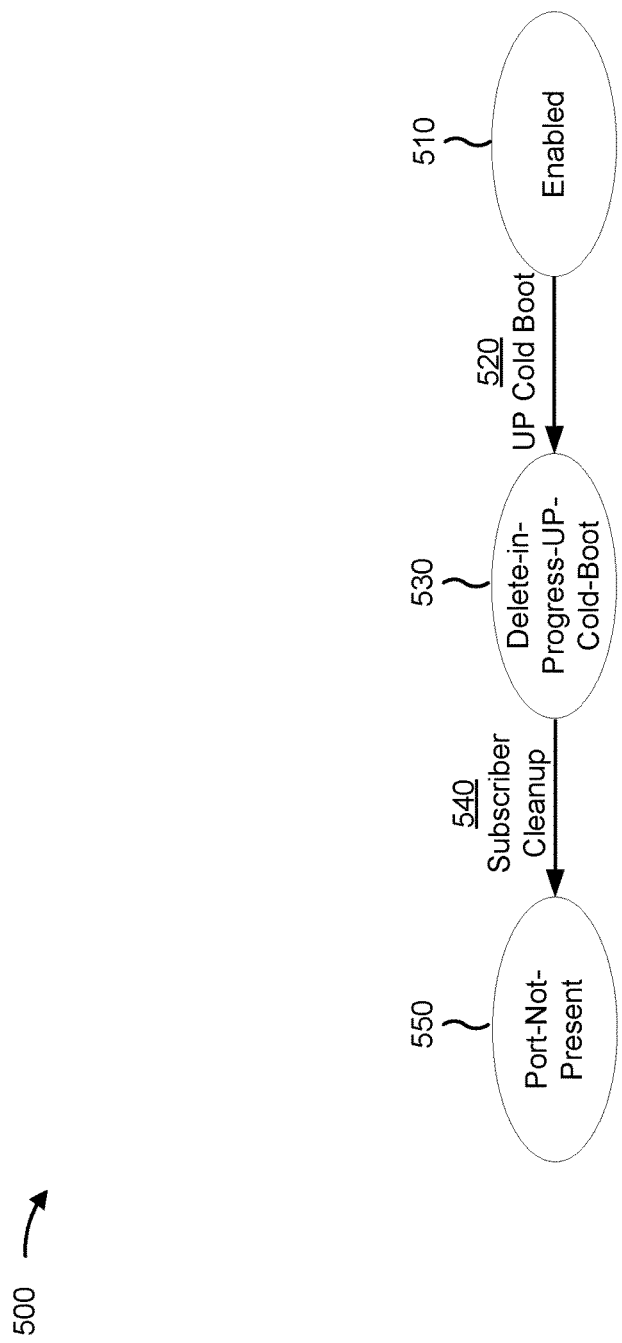
FIG. 5 is a diagram of an example implementation associated with a failure of a user plane subscriber access device.

FIG. 5 is a diagram of an example implementation 500 associated with a failure (e.g., a cold boot (e.g., restart)) of the user plane subscriber access device. As shown by reference number 510, the network device may assign, based at least in part on a first triggering event, a logical port administrative state of "Enabled" to a logical port.

As shown by reference number 520, the network device identifies a second triggering event (e.g., a cold boot associated with the user plane subscriber access device). As shown by reference number 530, the network device assigns, based at least in part on the second triggering event, a logical port administrative state of "Delete-in-Progress-UP-Cold-Boot" to the logical port.

As shown by reference number 540, the network device identifies a third triggering event (e.g., an SGRP cleanup indication). As shown by reference number 550, the network device assigns, based at least in part on the third triggering event, a logical port administrative state of "Port-Not-Present" to the logical port.

As indicated above, FIG. 5 is provided as an example. Other examples may differ from what is described with regard to FIG. 5. The number and arrangement of devices shown in FIG. 5 are provided as an example. In practice, there may be additional devices, fewer devices, different devices, or differently arranged devices than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) shown in FIG. 5 may perform one or more functions described as being performed by another set of devices shown in FIG. 5.

Figure 6:
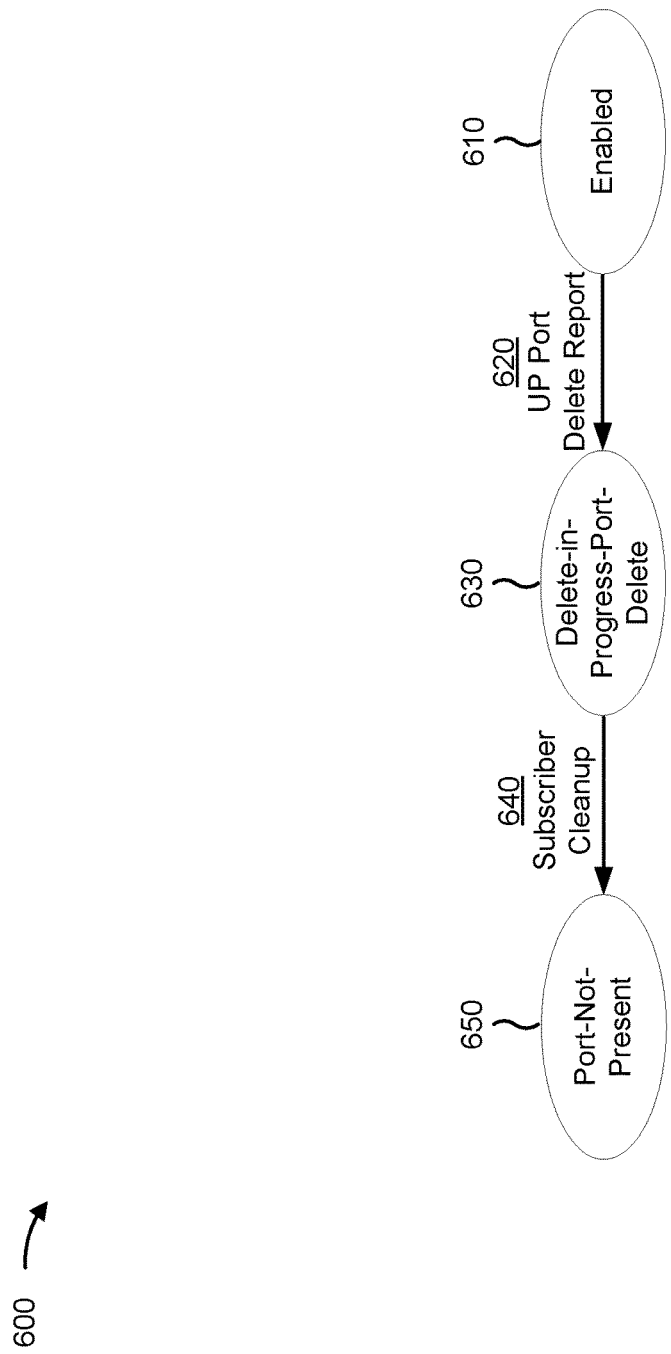
FIG. 6 is a diagram of an example implementation associated with a deletion of a logical port.

FIG. 6 is a diagram of an example implementation 600 associated with a deletion of the logical port (e.g., due to a line card of the user plane subscriber access device rebooting (e.g., restarting)). As shown by reference number 610, the network device may assign, based at least in part on a first triggering event, a logical port administrative state of "Enabled" to a logical port.

As shown by reference number 620, the network device identifies a second triggering event (e.g., a reception of a report associated with deletion of the logical port). As shown by reference number 630, the network device assigns, based at least in part on the second triggering event, a logical port administrative state of "Delete-in-Progress-UP-Port-Delete" to the logical port.

As shown by reference number 640, the network device identifies a third triggering event (e.g., an SGRP cleanup indication). As shown by reference number 650, the network device assigns, based at least in part on the third triggering event, a logical port administrative state of "Port-Not-Present" to the logical port.

As indicated above, FIG. 6 is provided as an example. Other examples may differ from what is described with regard to FIG. 6. The number and arrangement of devices shown in FIG. 6 are provided as an example. In practice, there may be additional devices, fewer devices, different devices, or differently arranged devices than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) shown in FIG. 6 may perform one or more functions described as being performed by another set of devices shown in FIG. 6.

Figure 7:
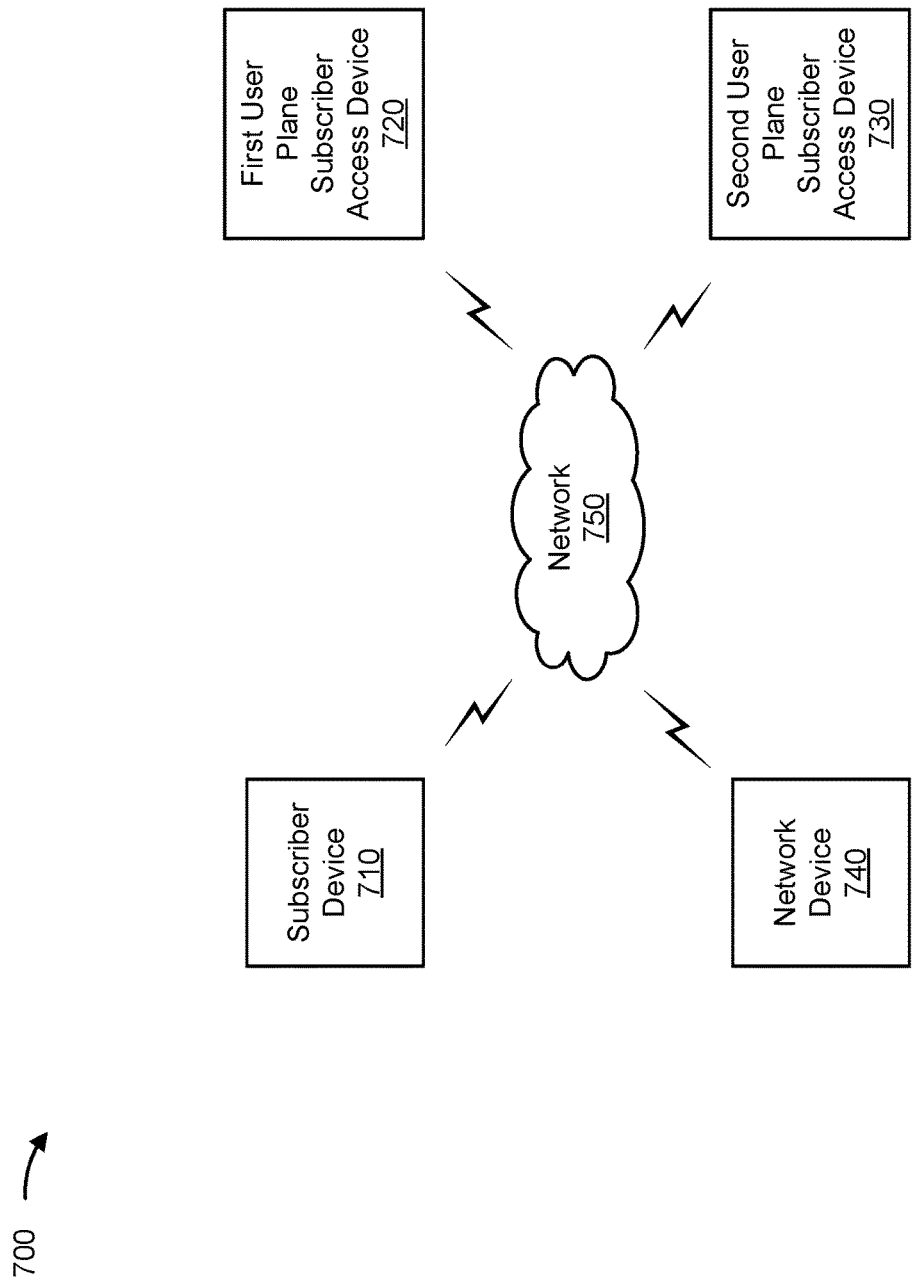
FIG. 7 is a diagram of an example environment in which systems and/or methods described herein may be implemented.

FIG. 7 is a diagram of an example environment 700 in which systems and/or methods described herein may be implemented. As shown in FIG. 7, environment 700 may include a subscriber device 710, a first user plane subscriber access device 720, a second user plane subscriber access device 730, a network device 740, and a network 750. Devices of environment 700 may interconnect via wired connections, wireless connections, or a combination of wired and wireless connections.

The subscriber device 710 may include one or more devices capable of receiving, generating, storing, processing, and/or providing information associated with or based on a logical port administrative state. The subscriber device 710 may include a communication device and/or a computing device. For example, the subscriber device 710 may include a wireless communication device, a mobile phone, a laptop computer, a tablet computer, a desktop computer, a wearable communication device (e.g., a smart wristwatch, a pair of smart eyeglasses, a head mounted display, or a virtual reality headset), or a similar type of device.

The first user plane subscriber access device 720 may be a first BNG-UP device, a first access gateway function user plane (AGF-UP) device, a first co-located BNG-UP/AGF-UP device, or the like, and the second user plane subscriber access device 730 may be a second BNG-UP device, a second AGF-UP device, a second co-located BNG-UP/AGF-UP device, or the like.

The network device 740 may be a control plane subscriber access device, such as a BNG-CP device, an access gateway function control plane (AGF-CP) device, a co-located BNG-CP/AGF-CP, or the like. The network device 740 may be responsible for managing the first user plane subscriber access device 720 and the second user plane subscriber access device 730. For example, the network device 740 may be responsible for assigning logical port administrative states associated with the first user plane subscriber access device 720 and the second user plane subscriber access device 730, controlling switchovers associated with the first user plane subscriber access device 720 and the second user plane subscriber access device 730, or the like.

The network 750 may include one or more wired and/or wireless networks. For example, the network 750 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 750 enables communication among the devices of environment 700.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Figure 8:
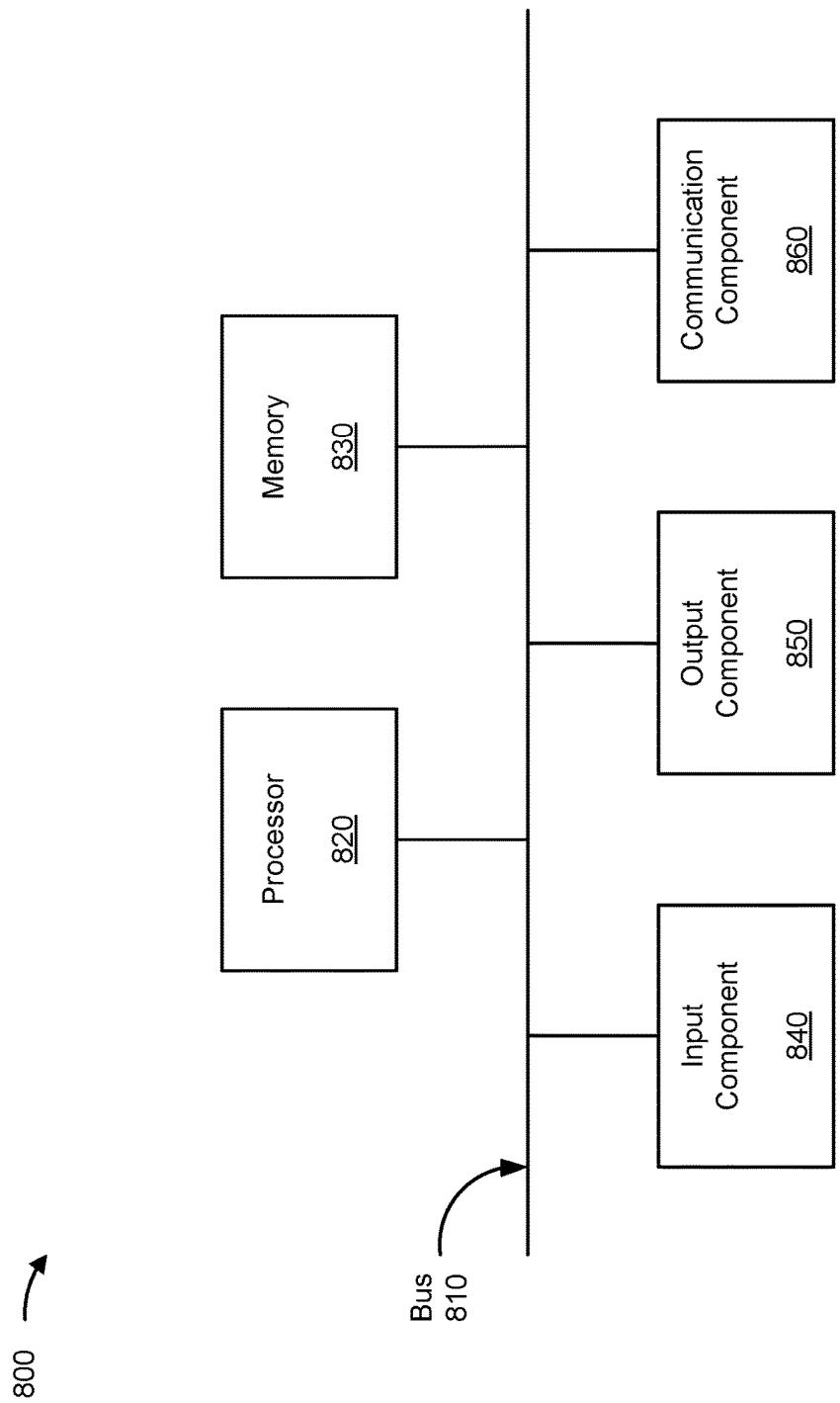
FIG. 8 is a diagram of example components of a device associated with logical port administrative states.

FIG. 8 is a diagram of example components of a device 800 associated with logical port administrative states. The device 800 may correspond to the subscriber device 710, the first user plane subscriber access device 720, the second user plane subscriber access device 730, the network device 740, and/or the network 750. In some implementations, the subscriber device 710, the first user plane subscriber access device 720, the second user plane subscriber access device 730, the network device 740, and/or the network 750 may include one or more devices 800 and/or one or more components of the device 800. As shown in FIG. 8, the device 800 may include a bus 810, a processor 820, a memory 830, an input component 840, an output component 850, and/or a communication component 860.

The bus 810 may include one or more components that enable wired and/or wireless communication among the components of the device 800. The bus 810 may couple together two or more components of FIG. 8, such as via operative coupling, communicative coupling, electronic coupling, and/or electric coupling. For example, the bus 810 may include an electrical connection (e.g., a wire, a trace, and/or a lead) and/or a wireless bus. The processor 820 may include a central processing unit, a graphics processing unit, a microprocessor, a controller, a microcontroller, a digital signal processor, a field-programmable gate array, an application-specific integrated circuit, and/or another type of processing component. The processor 820 may be implemented in hardware, firmware, or a combination of hardware and software. In some implementations, the processor 820 may include one or more processors capable of being programmed to perform one or more operations or processes described elsewhere herein.

The memory 830 may include volatile and/or nonvolatile memory. For example, the memory 830 may include random access memory (RAM), read only memory (ROM), a hard disk drive, and/or another type of memory (e.g., a flash memory, a magnetic memory, and/or an optical memory). The memory 830 may include internal memory (e.g., RAM, ROM, or a hard disk drive) and/or removable memory (e.g., removable via a universal serial bus connection). The memory 830 may be a non-transitory computer-readable medium. The memory 830 may store information, one or more instructions, and/or software (e.g., one or more software applications) related to the operation of the device 800. In some implementations, the memory 830 may include one or more memories that are coupled (e.g., communicatively coupled) to one or more processors (e.g., processor 820), such as via the bus 810. Communicative coupling between a processor 820 and a memory 830 may enable the processor 820 to read and/or process information stored in the memory 830 and/or to store information in the memory 830.

The input component 840 may enable the device 800 to receive input, such as user input and/or sensed input. For example, the input component 840 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 850 may enable the device 800 to provide output, such as via a display, a speaker, and/or a light-emitting diode. The communication component 860 may enable the device 800 to communicate with other devices via a wired connection and/or a wireless connection. For example, the communication component 860 may include a receiver, a transmitter, a transceiver, a modem, a network interface card, and/or an antenna.

The device 800 may perform one or more operations or processes described herein. For example, a non-transitory computer-readable medium (e.g., memory 830) may store a set of instructions (e.g., one or more instructions or code) for execution by the processor 820. The processor 820 may execute the set of instructions to perform one or more operations or processes described herein. In some implementations, execution of the set of instructions, by one or more processors 820, causes the one or more processors 820 and/or the device 800 to perform one or more operations or processes described herein. In some implementations, hardwired circuitry may be used instead of or in combination with the instructions to perform one or more operations or processes described herein. Additionally, or alternatively, the processor 820 may be configured to perform one or more operations or processes described herein. Thus, implementations described herein are not limited to any specific combination of hardware circuitry and software.

The number and arrangement of components shown in FIG. 8 are provided as an example. The device 800 may include additional components, fewer components, different components, or differently arranged components than those shown in FIG. 8. Additionally, or alternatively, a set of components (e.g., one or more components) of the device 800 may perform one or more functions described as being performed by another set of components of the device 800.

Figure 9:
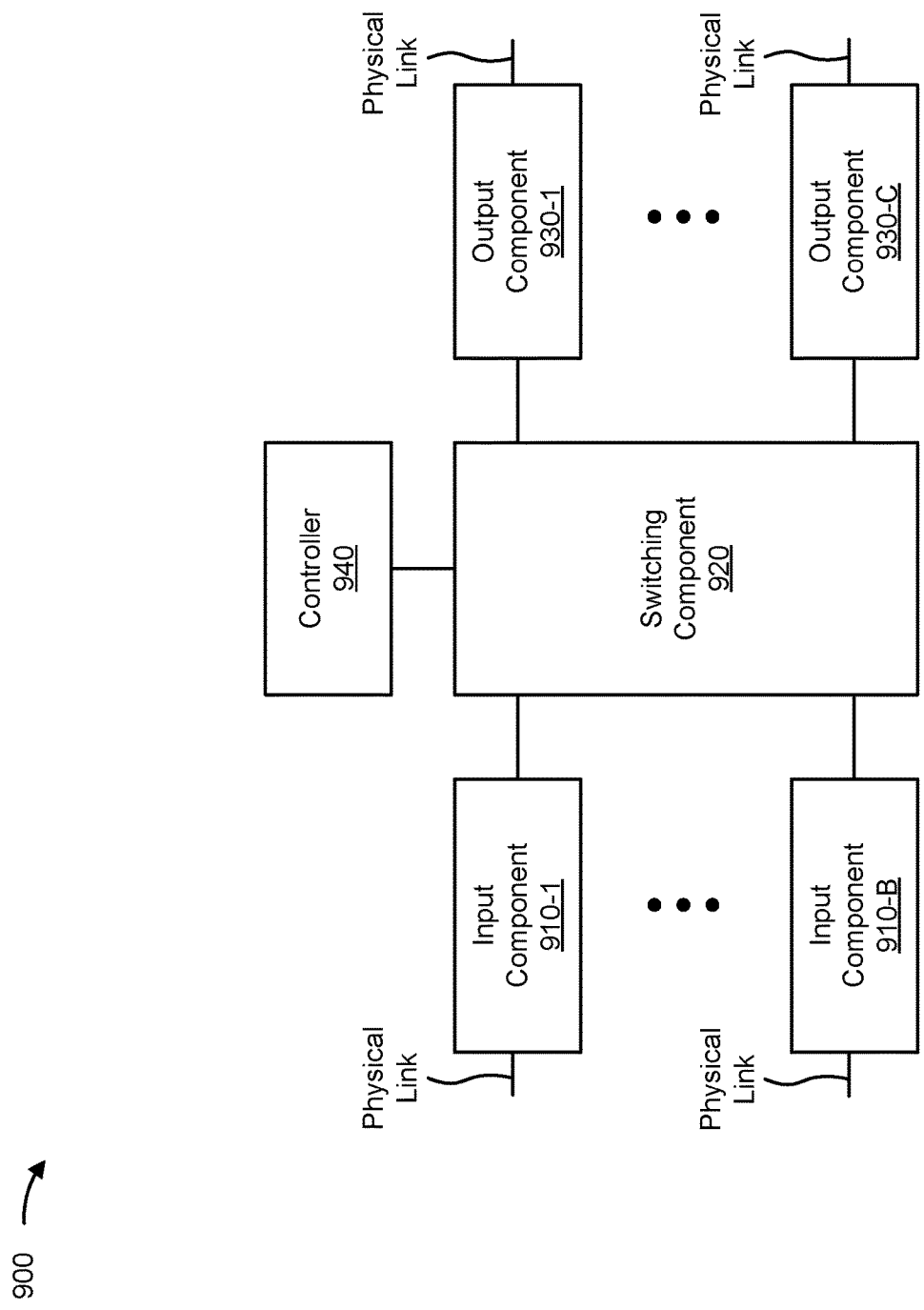
FIG. 9 is a diagram of example components of a device associated with logical port administrative states.

FIG. 9 is a diagram of example components of a device 900 associated with logical port administrative states. Device 900 may correspond to the first user plane subscriber access device 720, the second user plane subscriber access device 730, and/or the network device 740. In some implementations, the first user plane subscriber access device 720, the second user plane subscriber access device 730, and/or the network device 740 may include one or more devices 900 and/or one or more components of device 900. As shown in FIG. 9, device 900 may include one or more input components 910-1 through 910-B (B≥1) (hereinafter referred to collectively as input components 910, and individually as input component 910), a switching component 920, one or more output components 930-1 through 930-C (C≥1) (hereinafter referred to collectively as output components 930, and individually as output component 930), and a controller 940.

Input component 910 may be one or more points of attachment for physical links and may be one or more points of entry for incoming traffic, such as packets. Input component 910 may process incoming traffic, such as by performing data link layer encapsulation or decapsulation. In some implementations, input component 910 may transmit and/or receive packets. In some implementations, input component 910 may include an input line card that includes one or more packet processing components (e.g., in the form of integrated circuits), such as one or more interface cards (IFCs), packet forwarding components, line card controller components, input ports, processors, memories, and/or input queues. In some implementations, device 900 may include one or more input components 910.

Switching component 920 may interconnect input components 910 with output components 930. In some implementations, switching component 920 may be implemented via one or more crossbars, via busses, and/or with shared memories. The shared memories may act as temporary buffers to store packets from input components 910 before the packets are eventually scheduled for delivery to output components 930. In some implementations, switching component 920 may enable input components 910, output components 930, and/or controller 940 to communicate with one another.

Output component 930 may store packets and may schedule packets for transmission on output physical links. Output component 930 may support data link layer encapsulation or decapsulation, and/or a variety of higher-level protocols. In some implementations, output component 930 may transmit packets and/or receive packets. In some implementations, output component 930 may include an output line card that includes one or more packet processing components (e.g., in the form of integrated circuits), such as one or more IFCs, packet forwarding components, line card controller components, output ports, processors, memories, and/or output queues. In some implementations, device 900 may include one or more output components 930. In some implementations, input component 910 and output component 930 may be implemented by the same set of components (e.g., and input/output component may be a combination of input component 910 and output component 930).

Controller 940 includes a processor in the form of, for example, a central processing unit (CPU), a graphics processing unit (GPU), an accelerated processing unit (APU), a microprocessor, a microcontroller, a digital signal processor (DSP), an field-programmable gate array (FPGA), an application-specific integrated circuit (ASIC), and/or another type of processor. The processor is implemented in hardware, firmware, or a combination of hardware and software. In some implementations, controller 940 may include one or more processors that can be programmed to perform a function.

In some implementations, controller 940 may include a RAM, a ROM, and/or another type of dynamic or static storage device (e.g., a flash memory, a magnetic memory, an optical memory, etc.) that stores information and/or instructions for use by controller 940.

In some implementations, controller 940 may communicate with other devices, networks, and/or systems connected to device 900 to exchange information regarding network topology. Controller 940 may create routing tables based on the network topology information, may create forwarding tables based on the routing tables, and may forward the forwarding tables to input components 910 and/or output components 930. Input components 910 and/or output components 930 may use the forwarding tables to perform route lookups for incoming and/or outgoing packets.

Controller 940 may perform one or more processes described herein. Controller 940 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 940 from another computer-readable medium or from another device via a communication interface. When executed, software instructions stored in a memory and/or storage component associated with controller 940 may cause controller 940 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 9 are provided as an example. In practice, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

Figure 10:
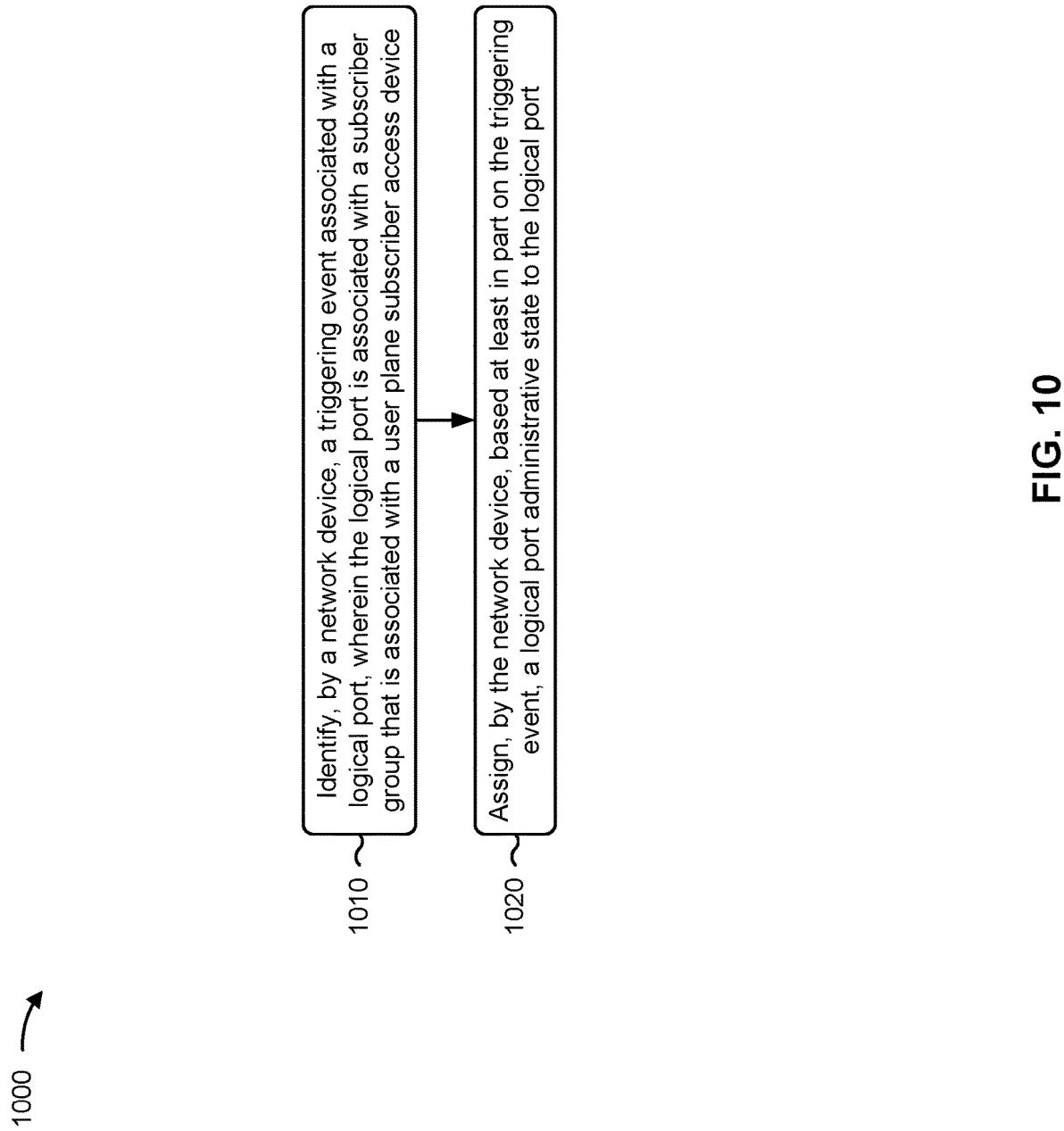
FIG. 10 is a flowchart of an example process associated with logical port administrative states.

FIG. 10 is a flowchart of an example process 1000 associated with logical port administrative states. In some implementations, one or more process blocks of FIG. 10 are performed by a network device (e.g., network device 740). In some implementations, one or more process blocks of FIG. 10 are performed by another device or a group of devices separate from or including the network device, such as a subscriber device (e.g., the subscriber device 710), a first user plane subscriber access device (e.g., the first user plane subscriber access device 720), a second user plane subscriber access device (e.g., the second user plane subscriber access device 730), a network device (e.g., the network device 740), and/or a network (e.g., the network 750). Additionally, or alternatively, one or more process blocks of FIG. 10 may be performed by one or more components of device 800, such as processor 820, memory 830, input component 840, output component 850, and/or communication component 860. Additionally, or alternatively, one or more process blocks of FIG. 10 may be performed by one or more components of device 900, such as input components 910, switching component 920, output components 930, and/or controller 940.

As shown in FIG. 10, process 1000 may include identifying a triggering event associated with a logical port, wherein the logical port is associated with an SGRP that is associated with a user plane subscriber access device (block 1010). For example, the network device may identify a triggering event associated with a logical port, wherein the logical port is associated with an SGRP that is associated with a user plane subscriber access device, as described above.

As further shown in FIG. 10, process 1000 may include assigning based at least in part on the triggering event, a logical port administrative state to the logical port (block 1020). For example, the network device may assign based at least in part on the triggering event, a logical port administrative state to the logical port, as described above.

Process 1000 may include additional implementations, such as any single implementation or any combination of implementations described below and/or in connection with one or more other processes described elsewhere herein.

In a first implementation, the triggering event is a first triggering event, the first triggering event is a configuration of the logical port, the logical port administrative state is a first logical port administrative state, the first logical port administrative state is associated with the logical port not being present on the user plane subscriber access device, and process 1000 includes identifying a second triggering event associated with the logical port, where the second triggering event is a reception of a report associated with an addition of the logical port on the user plane subscriber access device, assigning, based at least in part on the second triggering event, a second logical port administrative state to the logical port, where the second logical port administrative state is associated with the user plane subscriber access device not having acknowledged an indication that the logical port is associated with the SGRP, identifying a third triggering event associated with the logical port, where the third triggering event is a reception of an acknowledgment of the indication that the logical port is associated with the SGRP, and assigning, based at least in part on the third triggering event, a third logical port administrative state to the logical port, where the third logical port administrative state is associated with the logical port being enabled.

In a second implementation, alone or in combination with the first implementation, the user plane subscriber access device is a first user plane subscriber access device, the triggering event is a first triggering event, the logical port administrative state is a first logical port administrative state, the first logical port administrative state is associated with the logical port being enabled, and process 1000 includes identifying a second triggering event associated with the logical port, where the second triggering event is a determination that a switchover from the first user plane subscriber access device to a second user plane subscriber access device is to occur, assigning, based at least in part on the second triggering event, a second logical port administrative state to the logical port, where the second logical port administrative state is associated with the first user plane subscriber access device entering a quiescent state, identifying a third triggering event associated with the logical port, where the third triggering event is the switchover, and assigning, based at least in part on the third triggering event, the first logical port administrative state to the logical port.

In a third implementation, alone or in combination with one or more of the first and second implementations, the SGRP is a first SGRP, the triggering event is a first triggering event, the logical port administrative state is a first logical port administrative state, the first logical port administrative state is associated with the logical port being enabled, and process 1000 includes identifying a second triggering event associated with the logical port, where the second triggering event is the logical port being deleted, assigning, based at least in part on the second triggering event, a second logical port administrative state to the logical port, where the second logical port administrative state is associated with the logical port being moved from the first SGRP to a second SGRP, identify a third triggering event associated with the logical port, where the third triggering event is a cleanup operation associated with the first SGRP, assigning, based at least in part on the third triggering event, a third logical port administrative state to the logical port, where the third logical port administrative state is associated with the logical port being unhealthy, identifying a fourth triggering event associated with the logical port, where the fourth triggering event is a reception of an acknowledgment that the logical port has been deleted, assigning, based at least in part on the fourth triggering event, a fourth logical port administrative state to the logical port, where the fourth logical port administrative state is associated with the user plane subscriber access device not having acknowledged an indication that the logical port is associated with the first SGRP, transmitting an indication to associate the logical port with a second SGRP, identifying a fifth triggering event associated with the logical port, where the fifth triggering event is a reception of an acknowledgment of the indication that the logical port is associated with the second SGRP, and assigning, based at least in part on the fifth triggering event, the first logical port administrative state.

In a fourth implementation, alone or in combination with one or more of the first through third implementations, the triggering event is a first triggering event, the logical port administrative state is a first logical port administrative state, and the first logical port administrative state is associated with the logical port being enabled, and process 1000 includes identifying a second triggering event associated with the logical port, where the second triggering event is a cold boot associated with the user plane subscriber access device, assigning, based at least in part on the second triggering event, a second logical port administrative state to the logical port, where the second logical port administrative state is associated with a deletion of the logical port due to the cold boot associated with the user plane subscriber access device being in progress, identifying a third triggering event associated with the logical port, where the third triggering event is an SGRP cleanup indication, and assigning, based at least in part on the third triggering event, a third logical port administrative state to the logical port, where the third logical port administrative state is associated with the logical port not being present on the user plane subscriber access device.

In a fifth implementation, alone or in combination with one or more of the first through fourth implementations, the triggering event is a first triggering event, the logical port administrative state is a first logical port administrative state, the first logical port administrative state is associated with the logical port being enabled, and process 1000 includes identifying a second triggering event associated with the logical port, where the second triggering event is a reception of a report associated with deletion of the logical port, assigning, based at least in part on the second triggering event, a second logical port administrative state to the logical port, where the second logical port administrative state is associated with a deletion of the logical port due to the report associated with the deletion of the logical port being in progress, identifying a third triggering event associated with the logical port, where the third triggering event is an SGRP cleanup indication, and assigning, based at least in part on the third triggering event, a third logical port administrative state to the logical port, where the third logical port administrative state is associated with the logical port not being present on the user plane subscriber access device.

In a sixth implementation, alone or in combination with one or more of the first through fifth implementations, the logical port administrative state is associated with the logical port not being present on the user plane subscriber access device.

In a seventh implementation, alone or in combination with one or more of the first through sixth implementations, the logical port administrative state is associated with the user plane subscriber access device not having acknowledged an indication that the logical port is associated with the SGRP.

In an eighth implementation, alone or in combination with one or more of the first through seventh implementations, the logical port administrative state is associated with the logical port being enabled.

In a ninth implementation, alone or in combination with one or more of the first through eighth implementations, wherein the logical port administrative state is associated with the user plane subscriber access device entering a quiescent state.

In a tenth implementation, alone or in combination with one or more of the first through ninth implementations, the SGRP is a first SGRP, and the logical port administrative state is associated with the logical port being moved from the first SGRP to a second SGRP.

In an eleventh implementation, alone or in combination with one or more of the first through tenth implementations, the logical port administrative state is associated with the logical port being unhealthy.

In a twelfth implementation, alone or in combination with one or more of the first through eleventh implementations, the logical port administrative state is associated with a deletion of the logical port due to a cold boot associated with the user plane subscriber access device being in progress.

In a thirteenth implementation, alone or in combination with one or more of the first through twelfth implementations, the logical port administrative state is associated with a deletion of the logical port due to a report associated with the deletion of the logical port being in progress.

In a fourteenth implementation, alone or in combination with one or more of the first through thirteenth implementations, the logical port administrative state is associated with the user plane subscriber access device entering a quiescent state, and a packet associated with the logical port is selectively dropped based at least in part on a priority of the packet.

In a fifteenth implementation, alone or in combination with one or more of the first through fourteenth implementations, the logical port administrative state is not associated with the user plane subscriber access device entering a quiescent state or with the logical port being enabled, and an operational state associated with the logical port is a down state.

In a sixteenth implementation, alone or in combination with one or more of the first through fifteenth implementations, the logical port administrative state is associated with the logical port being enabled, a state associated with the SGRP is an active state, and an operational state associated with the logical port is an up state.

In a seventeenth implementation, alone or in combination with one or more of the first through sixteenth implementations, the logical port administrative state is associated with the logical port being enabled, a state associated with the SGRP is a backup state, and an operational state associated with the logical port is a down state.

Although FIG. 10 shows example blocks of process 1000, in some implementations, process 1000 includes additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
identifying, by a network device, a triggering event associated with a logical port, wherein the logical port is associated with a first subscriber group (SGRP) that is associated with a user plane subscriber access device; and
assigning, by the network device, based at least in part on the triggering event, a logical port administrative state to the logical port,
wherein the logical port administrative state is associated with at least one of:
the logical port being moved from the first SGRP to a second SGRP,
a deletion of the logical port due to a cold boot associated with the user plane subscriber access device being in progress,
the user plane subscriber access device entering a quiescent state, and
wherein a packet associated with the logical port is selectively dropped based at least in part on a priority of the packet,
the logical port being enabled, wherein a state associated with the first SGRP is an active state, and wherein an operational state associated with the logical port is an up state, or
the logical port being enabled, wherein a state associated with the first SGRP is a backup state, and wherein an operational state associated with the logical port is a down state.

2. The method of claim 1, wherein the triggering event is a first triggering event, wherein the first triggering event is a configuration of the logical port, wherein the logical port administrative state is a first logical port administrative state, and wherein the first logical port administrative state is associated with the logical port not being present on the user plane subscriber access device, the method further comprising:
identifying, by the network device, a second triggering event associated with the logical port, wherein the second triggering event is a reception of a report associated with an addition of the logical port on the user plane subscriber access device;
assigning, by the network device, based at least in part on the second triggering event, a second logical port administrative state to the logical port, wherein the second logical port administrative state is associated with the user plane subscriber access device not having acknowledged an indication that the logical port is associated with the SGRP;
identifying, by the network device, a third triggering event associated with the logical port, wherein the third triggering event is a reception of an acknowledgment of the indication that the logical port is associated with the SGRP; and
assigning, by the network device, based at least in part on the third triggering event, a third logical port administrative state to the logical port, wherein the third logical port administrative state is associated with the logical port being enabled.

3. The method of claim 1, wherein the user plane subscriber access device is a first user plane subscriber access device, wherein the triggering event is a first triggering event, wherein the logical port administrative state is a first logical port administrative state, and wherein the first logical port administrative state is associated with the logical port being enabled, the method further comprising:
identifying, by the network device, a second triggering event associated with the logical port, wherein the second triggering event is a determination that a switchover from the first user plane subscriber access device to a second user plane subscriber access device is to occur;
assigning, by the network device, based at least in part on the second triggering event, a second logical port administrative state to the logical port, wherein the second logical port administrative state is associated with the first user plane subscriber access device entering a quiescent state;
identifying, by the network device, a third triggering event associated with the logical port, wherein the third triggering event is the switchover; and
assigning, by the network device, based at least in part on the third triggering event, the first logical port administrative state to the logical port.

4. The method of claim 1, wherein the SGRP is a first SGRP, wherein the triggering event is a first triggering event, wherein the logical port administrative state is a first logical port administrative state, and wherein the first logical port administrative state is associated with the logical port being enabled, the method further comprising:
identifying, by the network device, a second triggering event associated with the logical port, wherein the second triggering event is the logical port being deleted;
assigning, by the network device, based at least in part on the second triggering event, a second logical port administrative state to the logical port, wherein the second logical port administrative state is associated with the logical port being moved from the first SGRP to a second SGRP;
identifying, by the network device, a third triggering event associated with the logical port, wherein the third triggering event is a cleanup operation associated with the first SGRP;
assigning, by the network device, based at least in part on the third triggering event, a third logical port administrative state to the logical port, wherein the third logical port administrative state is associated with the logical port being unhealthy;
identifying, by the network device, a fourth triggering event associated with the logical port, wherein the fourth triggering event is a reception of an acknowledgment that the logical port has been deleted;
assigning, by the network device, based at least in part on the fourth triggering event, a fourth logical port administrative state to the logical port, wherein the fourth logical port administrative state is associated with the user plane subscriber access device not having acknowledged an indication that the logical port is associated with the first SGRP;

transmitting an indication to associate the logical port with a second SGRP;

identifying, by the network device, a fifth triggering event associated with the logical port, wherein the fifth triggering event is a reception of an acknowledgment of the indication that the logical port is associated with the second SGRP; and assigning, by the network device, based at least in part on the fifth triggering event, the first logical port administrative state.

5. The method of claim 1, wherein the triggering event is a first triggering event, wherein the logical port administrative state is a first logical port administrative state, and wherein the first logical port administrative state is associated with the logical port being enabled, the method further comprising:

identifying, by the network device, a second triggering event associated with the logical port, wherein the second triggering event is a cold boot associated with the user plane subscriber access device;

assigning, by the network device, based at least in part on the second triggering event, a second logical port administrative state to the logical port, wherein the second logical port administrative state is associated with a deletion of the logical port due to the cold boot associated with the user plane subscriber access device being in progress;

identifying, by the network device, a third triggering event associated with the logical port, wherein the third triggering event is an SGRP cleanup indication; and assigning, by the network device, based at least in part on the third triggering event, a third logical port administrative state to the logical port, wherein the third logical port administrative state is associated with the logical port not being present on the user plane subscriber access device.

6. The method of claim 1, wherein the triggering event is a first triggering event, wherein the logical port administrative state is a first logical port administrative state, and wherein the first logical port administrative state is associated with the logical port being enabled, the method further comprising:

identifying, by the network device, a second triggering event associated with the logical port, wherein the second triggering event is a reception of a report associated with deletion of the logical port;

assigning, by the network device, based at least in part on the second triggering event, a second logical port administrative state to the logical port, wherein the second logical port administrative state is associated with a deletion of the logical port due to the report associated with the deletion of the logical port being in progress;

identifying, by the network device, a third triggering event associated with the logical port, wherein the third triggering event is an SGRP cleanup indication; and assigning, by the network device, based at least in part on the third triggering event, a third logical port administrative state to the logical port, wherein the third logical port administrative state is associated with the logical port not being present on the user plane subscriber access device.

7. The method of claim 1, wherein at least one of the first SGRP or the second SGRP span a first user plane subscriber access device and a second user plane subscriber access device.

8. A network device, comprising:
one or more memories; and
one or more processors to:
identify a triggering event associated with a logical port, wherein the logical port is associated with a first subscriber group (SGRP) that is associated with a user plane subscriber access device; and
assign, based at least in part on the triggering event, a logical port administrative state to the logical port, wherein the logical port administrative state is associated with at least one of:
the logical port being moved from the first SGRP to a second SGRP,
a deletion of the logical port due to a cold boot associated with the user plane subscriber access device being in progress,
the user plane subscriber access device entering a quiescent state, and wherein a packet associated with the logical port is selectively dropped based at least in part on a priority of the packet,
the logical port being enabled, wherein a state associated with the first SGRP is an active state, and wherein an operational state associated with the logical port is an up state, or
the logical port being enabled, wherein a state associated with the first SGRP is a backup state, and wherein an operational state associated with the logical port is a down state.

9. The network device of claim 8, wherein the logical port administrative state is associated with the logical port not being present on the user plane subscriber access device.

10. The network device of claim 8, wherein the logical port administrative state is associated with the user plane subscriber access device not having acknowledged an indication that the logical port is associated with the SGRP.

11. The network device of claim 8, wherein the logical port administrative state is associated with the logical port being enabled.

12. The network device of claim 8, wherein the logical port administrative state is associated with the user plane subscriber access device entering a quiescent state.

13. The network device of claim 8, wherein the logical port administrative state is associated with the logical port being unhealthy.

14. The network device of claim 8, wherein the logical port administrative state is associated with a deletion of the logical port due to a report associated with the deletion of the logical port being in progress.

15. The device of claim 8, wherein the SGRP contains one or more redundancy interfaces.

16. The device of claim 8, wherein at least one of the first SGRP or the second SGRP span a first user plane subscriber access device and a second user plane subscriber access device.

17. A non-transitory computer-readable medium storing a set of instructions, the set of instructions comprising:
one or more instructions that, when executed by one or more processors of a network device, cause the network device to:
identify a triggering event associated with a logical port, wherein the logical port is associated with a first subscriber group (SGRP) that is associated with a user plane subscriber access device; and assign, based at least in part on the triggering event, a logical port administrative state to the logical port, wherein the logical port administrative state is associated with at least one of:

the logical port being moved from the first SGRP to a second SGRP, a deletion of the logical port due to a cold boot associated with the user plane subscriber access device being in progress, the user plane subscriber access device entering a quiescent state, and wherein a packet associated with the logical port is selectively dropped based at least in part on a priority of the packet, the logical port being enabled, wherein a state associated with the first SGRP is an active state, and wherein an operational state associated with the logical port is an up state, or the logical port being enabled, wherein a state associated with the first SGRP is a backup state, and wherein an operational state associated with the logical port is a down state.

18. The non-transitory computer-readable medium of claim 17, wherein the logical port administrative state is not associated with the user plane subscriber access device entering a quiescent state or with the logical port being enabled, and wherein an operational state associated with the logical port is a down state.

19. The non-transitory computer-readable medium of claim 17, wherein the SGRP contains one or more redundancy interfaces.

20. The non-transitory computer-readable medium of claim 17, wherein at least one of the first SGRP or the second SGRP span a first user plane subscriber access device and a second user plane subscriber access device.

* * * * *